W. P. TARRANT.
POURING POT.
APPLICATION FILED JULY 21, 1910.
1,005,582.
Patented Oct. 10, 1911.
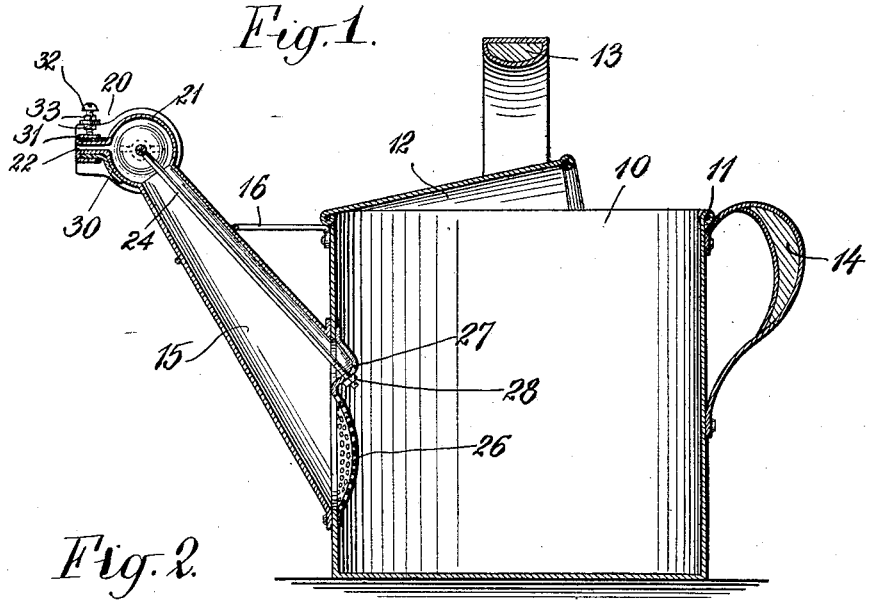
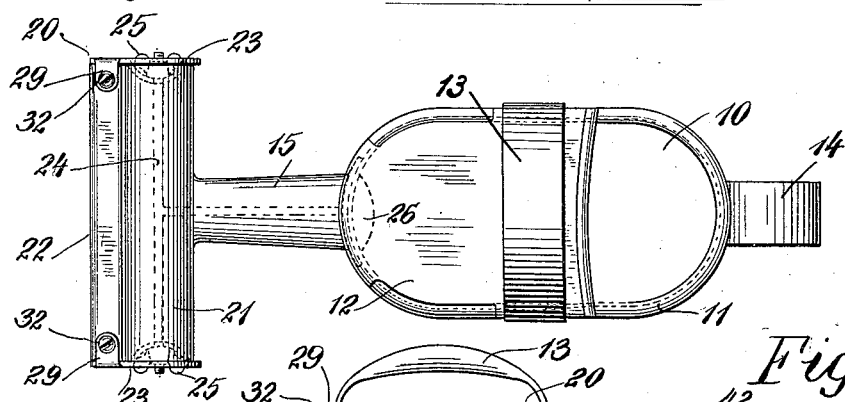
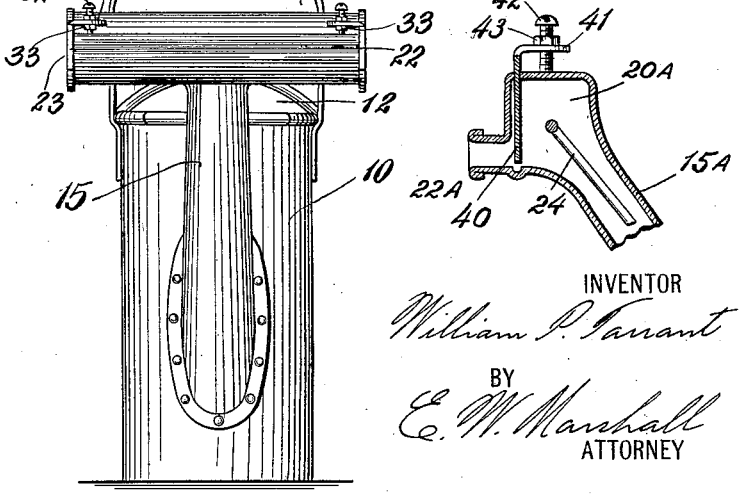
WITNESSES:
INVENTOR
William P. Tarrant
BY
E. W. Marshall
ATTORNEY

UNITED STATES PATENT OFFICE.

WILLIAM P. TARRANT, OF SARATOGA SPRINGS, NEW YORK.

POURING-POT.

1,005,582.   Specification of Letters Patent.   Patented Oct. 10, 1911.

Application filed July 21, 1910. Serial No. 573,005.

*To all whom it may concern:*

Be it known that I, WILLIAM P. TARRANT, a citizen of the United States, and a resident of Saratoga Springs, in the county of Saratoga and State of New York, United States of America, have invented certain new and useful Improvements in Pouring-Pots, of which the following is a specification.

My invention relates to pouring pots especially designed for use in road building for applying by hand a thin even coating of oils, hot asphalt, or bituminous materials to the surface of a finished road or to one in the process of construction.

To these ends my invention resides in the construction and arrangements of parts which I will describe in the following specification and the novel features of which I will set forth in the appended claims.

Referring to the drawings, Figure 1 is a sectional side elevation of a pouring pot made according to my invention. Fig. 2 is a plan view of the same, and in Fig. 3 I have shown the device in front elevation. In Fig. 4 I have illustrated in sectional side elevation a modified form of my invention.

Like characters of reference designate corresponding parts in all of the figures.

10 designates the body of the apparatus which forms a receptacle for the material which is to be distributed. This body portion may be made in any desired shape or form, such, for example, as that shown in the drawings. Its upper edge may be rolled over and reinforced as shown at 11.

12 is a top plate which covers the forward upper end of this receptacle.

13 is a fixed bail or handle extending over the top of the pot, and 14 is another handle affixed to the rear vertical side thereof. A spout 15 is riveted or otherwise suitably affixed to the front vertical side of the body 10, and this, if desired, may be further supported by a brace such as that shown at 16. To the upper or outer end of the spout 15 is affixed a distributer 20 which comprises a cylindrical casing formed of sheet metal and having its edges bent forward and back, as shown, to form a slot-like nozzle 22 parallel with the axis of the casing. The ends of the casing 21 and of the nozzle are closed by end-plates 23, 23 which are held in place by a simple device which I will describe. A T-shaped member 24 has one of its parts so proportioned and arranged that it runs transversely through the center of the chamber formed by the casing 21. The ends of this transverse rod are threaded and pass through holes in the end-plates 23. Wing nuts 25 on these threaded ends serve to hold the end plates firmly against the ends of the casing and of the nozzle, and to hold the T-shaped member 24 in the desired position. The other part of the member 24 is arranged to run longitudinally down through the spout and through a part of the strainer plate 26 which fits over the lower end of the spout. This strainer plate is constructed to form a shoulder 27, through which this longitudinal part of the member 24 runs, and a nut 28 on its end, which is threaded for this purpose, holds the strainer plate in place. The sheet metal which forms the lower lip of the nozzle 22 may be bent over one edge of an angle-iron 30 which may be affixed to this lip and to the casing 21. Similarly, the sheet metal which forms the upper lip may be bent over a stiffening bar 31 and affixed thereto. This angle-iron and stiffening bar are not essential parts of the structure but may be added if the doubled over metal of which the lips are constructed has not sufficient rigidity to perform the functions for which these parts are designed, and which will be specifically set forth hereinafter. The forward edges of the end-plates 23 are bent over as shown at 29 to form lugs which support adjusting screws 32. If desired these lugs may be made of separate pieces suitably affixed to the end-plates. The adjusting screws bear upon the upper lip of the nozzle and are provided for the purpose of varying the width of the nozzle at will. Lock-nuts 33 are provided on the adjusting screws.

By means of such a structure as has now been pointed out a thin sheet of desired thickness of liquid or semi-liquid material may be poured onto a desired surface. The chamber within the cylindrical casing 21 allows a sufficient amount of material to accumulate behind the nozzle to insure an even flow of the material through the nozzle so that the sheet will be of even thickness through the entire width of the nozzle.

With such materials as those for which this pouring pot has been especially designed it is of importance that it may easily be taken apart so that it may be cleaned from time to time. Asphalt, tarvia, heavy bituminous oils and similar materials such as are now commonly used in road-building, quickly clog up any such devices as have heretofore been available. The strainer plate will catch dirt and foreign substances which are of such size that they will not pass through the nozzle. This strainer plate too is removable so that it may be cleaned.

The whole device is made of sufficient lightness so that it may be carried by hand, but the parts thereof are preferably constructed of strong heavy materials so that any substances which may congeal or harden on them may be burned off without injury to such parts.

In the form of my invention which is shown in Fig. 4 the distributer chamber 20$^A$ is formed as a continuation of the spout 15$^A$. 22$^A$ is the nozzle which runs across and is in communication with this distributer chamber, but in this case instead of the distance between the lips of the nozzle being variable, a movable gate 40 is provided which extends across the forward end of the distributer chamber and up through a transverse slot through the top of the casing which forms this chamber. Lugs 41, integral with the gate, are bent over at substantially right-angles to the gate 40, and through these are threaded set-screws 42 which may be provided with lock-nuts 43 and which bear upon the top of the chamber 20$^A$ to limit the downward movement of the gate. With this arrangement the flow of material through the nozzle is regulated by setting the vertical position of the gate 40 to allow desired amounts of the material to pass.

I have illustrated more than one form of my invention to show that I do not limit myself to any specific form of construction of parts.

What I claim is.—

1. A pouring pot comprising a receptacle, a spout projecting therefrom, a strainer plate over the lower end of said spout, a casing on the upper end of the spout, said casing being constructed of sheet metal and arranged to form a distributing chamber, and a slot-like nozzle communicating with said chamber; removable end-plates over the ends of said casing and nozzle, and a holding member arranged to hold said end-plates and strainer plate in place.

2. A pouring pot comprising a receptacle, a spout projecting therefrom, a removable strainer plate over the lower end of said spout, a casing on the upper end of said spout, said casing being constructed of sheet metal and arranged to form a cylindrical distributing chamber, said metal being bent forward to form the lips of a transverse slot-like nozzle communicating with said chamber, adjusting screws for varying the distance between said lips, and a T-shaped holding member arranged to hold said end-plates and strainer plate in place.

In testimony whereof I have signed my name to this specification in the presence of two subscribing witnesses.

WILLIAM P. TARRANT.

Witnesses:
WILL W. SMITH,
H. B. BULLARD.

---

Copies of this patent may be obtained for five cents each, by addressing the "Commissioner of Patents, Washington, D. C."